United States Patent [19]
Stamper

[11] Patent Number: 4,797,021
[45] Date of Patent: Jan. 10, 1989

[54] QUICK RELEASE JOINTS AND STRUCTURES INCORPORATING SAME

[76] Inventor: John W. Stamper, The Mounds, 19 Westwood Park Road, Peterborough PE3 6JL, Cambridgeshire, United Kingdom

[21] Appl. No.: 29,273

[22] Filed: Mar. 23, 1987

[30] Foreign Application Priority Data

Apr. 1, 1986 [GB] United Kingdom ............... 8607992

[51] Int. Cl.4 .......................... B25G 3/00; F16B 7/00
[52] U.S. Cl. .................... 403/407.1; 403/298; 403/292
[58] Field of Search ............ 403/164, 165, 292, 298, 403/407.1; 24/588

[56] References Cited

U.S. PATENT DOCUMENTS

| | | | |
|---|---|---|---|
| 2,240,268 | 4/1941 | Ruddy | 403/407.1 X |
| 3,527,486 | 9/1970 | Gamp | 403/298 X |
| 3,685,105 | 8/1972 | Carlile et al. | 24/588 X |
| 3,810,341 | 5/1974 | Holz | 403/292 X |
| 4,012,155 | 3/1977 | Morris | 403/290 |
| 4,037,978 | 7/1977 | Connelly | 403/164 |
| 4,616,953 | 10/1986 | Gomes | 403/407.1 |

Primary Examiner—Andrew V. Kundrat
Attorney, Agent, or Firm—McCormick, Paulding and Huber

[57] ABSTRACT

A quick release joint (10) for interconnecting structural modules such as table or shelf units (54) in stacked configuration comprises a ball and socket type joint constructed and/or arranged to provide structural integrity in the assembled condition of the joint. In one embodiment abutment surfaces (46, 48) on the ends of the ball and socket joint elements make face-to-face contact and thereby hold the joint in a fixed configuration. In another embodiment, three or more joints at the corners of a triangle provide structural integrity. In a further version, abutment surfaces on the structures joined themselves prevent pivotal movement of the joint. In all cases the joints are assembled merely by compression and disconnected by application of tension.

3 Claims, 3 Drawing Sheets

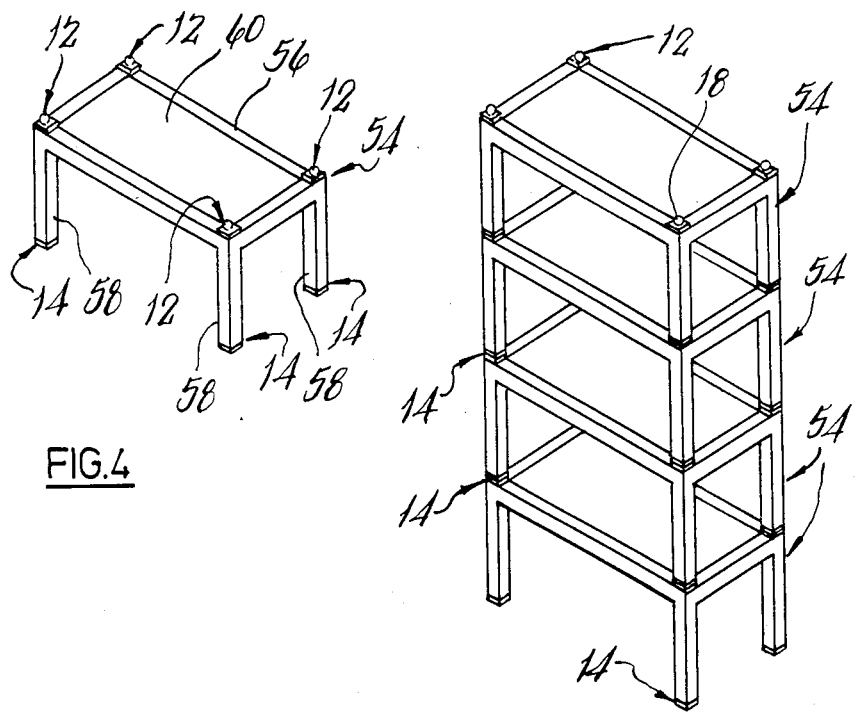
FIG.4
FIG.5
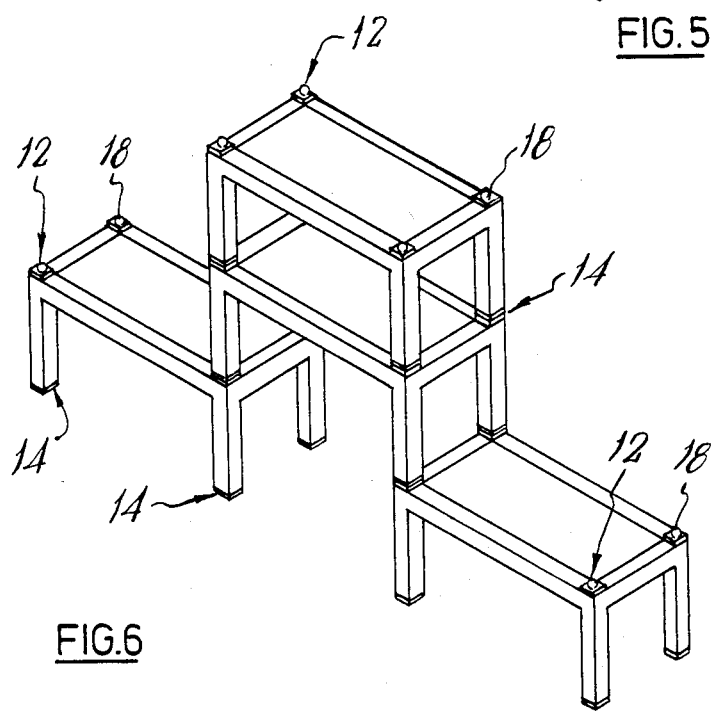
FIG.6

QUICK RELEASE JOINTS AND STRUCTURES INCORPORATING SAME

This invention relates to quick release joints and to structures incorporating the same. An example of the application of the invention is to a joint for interconnecting shelving modules so as to be able to assemble and disassemble same with greater ease and rapidity than has hitherto been possible. The invention also has many other applications as mentioned below.

Presently available arrangements for connecting and disconnecting structures such as shelving, scaffolding, and other structures include sleeve joints of various kinds and, of course, various kinds of joints including fasteners such as nuts and bolts.

Sleeve joints can produce a strong and stable resultant structure but they require fairly accurately dimensioned interfitting parts and this requirement leads to production difficulties and expense. Moreover, in view of the fairly accurate fit required, these joints are somewhat susceptible to variations in performance dependent upon temperature variations. The joints are also not particularly easy or quick to assemble.

So far as joint systems involving the use of fasteners such as nuts and bolts, the obvious problem is that such an arrangement is slow and laborious to assemble and disassemble, and for this reason alone the result is often that such structures once assembled are never disassembled with a view to changing the arrangement or structure of the article concerned.

There is therefore a need for an improved quick release joint, together with structures incorporating the same, in which the joint and the structure incorporating same is quicker and easier to assemble than previously available such joints and which moreover provides a sufficient degree of structural integrity and rigidity in the assembled state to enable the structure to be used for purposes requiring rigidity and structural integrity. In this specification references to structural integrity are intended to mean that the structure concerned has, in its assembled state, a rigid structure which retains its rigidity and integrity up to a predetermined load limit dependent upon the physical constance of the joint or joints employed. Obviously, in the case of a quick release joint which can be released by the application of tension, there is a point at which tension or side loading applied to the structure will cause a loss of structural integrity.

An object of the present invention is to provide quick release joints and structures incorporating same offering improvements in relation to one or more of the matters discussed above, or generally.

According to the invention there is provided a ball and socket type joint as defined in the claims hereof. The invention also provides a structural unit incorporating such a joint.

According to another aspect of the present invention there is provided a quick release joint and a structure incorporating same possessing any advantage or technical feature disclosed herein and further comprising any novel feature or novel combination of features disclosed in this application.

In embodiments described below there are provided ball and socket type joints which themselves incorporate abutment means to substantially prevent pivotal movement of the joint elements in the assembled condition of same. In this way, structural integrity of two structural units connected by the joint is provided. The provision of abutment means for this purpose enables the advantages of ball and socket type joints in relation to ease of connection and disconnection to be retained in association with an assembly having structural integrity. Such has hitherto not been possible in relation to ball and socket type joints which, to the best of the Applicant's knowledge, have hitherto always provided for pivotal movement in a universal manner or at least in one plane.

By the expression "ball and socket type joint" as used in this application and in the claims, it is not intended that the structure so-recited should be limited to the use of a spherical ball and a complementary socket. The expression is adopted as a convenient means for referring to joints incorporating a projecting shoulder element and is not to be understood as limited to a strictly spherical ball co-operating with a complementary socket but includes any suitable shoulder element (such as a ball) which co-operates with any suitable receptor element (such as an aperture) to permit connection and disconnection in the well known manner.

In other embodiments disclosed below, structural integrity in the assembled condition of the joint or the structure joined thereby is provided in several other ways. These include the provision of three or more complementary shoulder and receptor elements in a single joint assembly, which need not necessarily be provided with face to face abutment means. Then again, where three or more joint assemblies are provided to interconnect two rigid structures, the joints being located at the corners of a triangle, the resulting structure will have the necessary integrity even where abutment surfaces are not provided in the joint units themselves. Thirdly, where the joint units are employed to interconnect two structures, the structures themselves may provide the necessary abutment surfaces whereby the resulting assembly has structural integrity while it is held together by the ball and socket type joint.

Other features of the embodiments disclosed below include the following. The joints have a pleasing and attractive appearance in which the shoulder element may be in the form of a ball, acorn or similar structure so as to be used decoratively. The shoulder element is usually provided on the uppermost joint element while the receptor element is usually provided as the lowermost one. The shoulder element may be formed integrally with a solid member such as a table leg. An advantage of an embodiment of the invention disclosed below is that it enables items such as tables to have a multiple function. Two or more such tables when joined one above the other become bookshelves yet can still be instantly made available for the usual function of tables. Likewise, a tiered tea trolley can be provided which readily splits into individual tables for use during a meal, after which these tables are rapidly built back into a tea trolley for a return journey.

The invention is also applicable to large structural sections in which the joint elements may be bonded or welded or bolted or pinned or riveted in position. Moreover, more than one shoulder element and corresponding receptor element may be provided on each joint element, depending on the strength and rigidity of the required joint. The joints may be made from any suitable material, such as plastic, metal or wood, and may be moulded, cast or fabricated.

In one embodiment disclosed below a particular advantage is achieved by joining channel sections in superimposed parallel form, the joints themselves being located "invisibly" within the assembly so that the latter is held together without any apparent means for achieving this.

In one embodiment, the receptor element incorporates a retaining ring which may be spring loaded into a groove to produce a grip of varying strength on the ball, according to structural requirements. The ball and socket parts can be machined into or fixed onto a solid bar, for example a bollard, with the complementary part fixed or machined to a hand-rail or panel. In this way, corner joints and intersections are possible in all planes and at all angles. The ball and socket parts can be so arranged to allow casting into concrete. Both the ball and socket parts can be adapted to accept keys for locking the assembly for security purposes. In many embodiments, the joints can be assembled by the application of hand pressure and can be disconnected by simply pulling apart.

Embodiments of the invention will now be described by way of example with reference to the accompanying drawing which:

FIG. 4 shows a perspective view of a table or shelf module incorporating joints according to the invention;

FIGS. 5 and 6 show perspective views of the module of FIG. 4 in two different stacked configurations;

Figure 1:
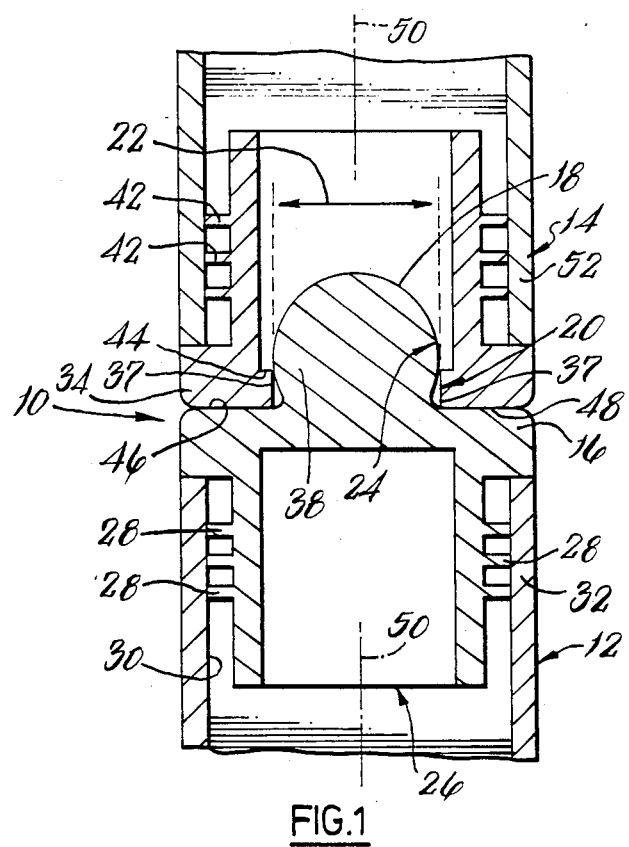
FIG. 1 shows a longitudinal section through a ball and socket type joint in the connected condition of same.
Figures 2, 3:
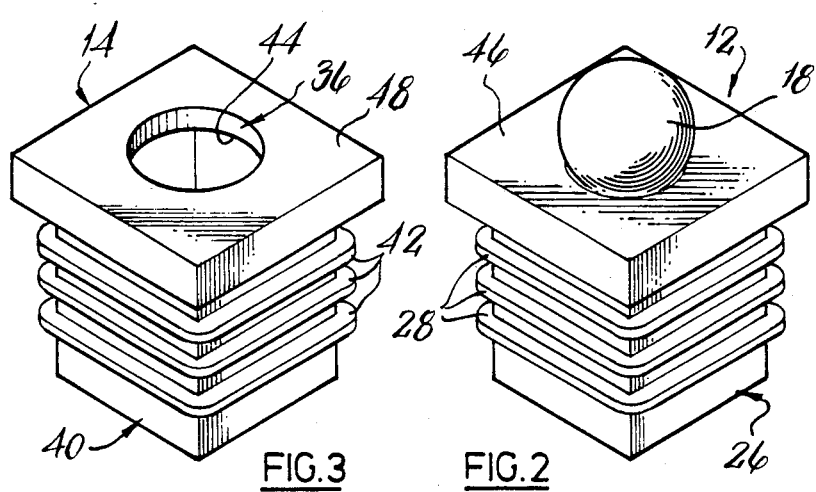
FIG. 2 and FIG. 3 show perspective views of the joint elements of the joint of FIG. 1.

As shown in FIGS. 1 to 3, a ball and socket type joint 10 comprises first and second joint elements 12,14 respectively which are adapted to be connected and disconnected by compression and tension applied to the joint 10. In this embodiment, the joint elements are formed as plastics mouldings. However, many alternative materials may be employed according to the physical requirements of the joint concerned.

The first joint element 12 shown in FIG. 2 comprises a joint base member 16 which is adapted to be secured to an article to be joined, such as a leg of a table or shelf module. Likewise, the joint base member could be formed integrally from an article to be joined. A joint shoulder element 18 is carried on the base member 16 and projects therefrom. A waist portion 20 connects the shoulder element 18 to the joint base member 16. In this embodiment the waist portion has insignificant longitudinal extent and amounts simply to a slight narrowing of the dimension of the shoulder element 18 as compared with its widest extent 22 in the region 24 of the shoulder element.

Shoulder element 18 is formed as an integral moulding with the joint base member 16. Likewise, the same moulding incorporates a projecting portion 26 of generally rectangular tubular form and carrying spaced ribs 28 for engagement with the inner surface 30 of a structural member 32 such as the frame of a table or shelf unit described below. Projecting portion 26 and ribs 28 render the joint element 12 a push-fit into structural member 32, being held in position by frictional forces. Of course, if needed, the joint element could be bonded or otherwise fixed in position.

Turning now to the second joint element 14, it will be seen that this comprises a joint base member 34 adapted to be secured to an article to be joined, such as the projecting leg of a table or shelf assembly. A joint receptor element 36 is provided in the form of a circular section opening formed in the base member and adapted to receive and hold the shoulder element 18. Opposite sides of the receptor element 36 constitute spaced retainer members which are spaced and positioned and constructed to permit the shoulder element to be inserted between them by the application of compression to the joint 10. This causes resilient deformation of the receptor element 36 and/or the shoulder element 18 during such insertion, after which the shoulder element is retained by engagement of the retainer members 37 of the receptor element with the waist portion 20 and/or with the portion 38 of shoulder element 18 adjacent waist portion 20.

It will be noted that second joint element 14 as shown in FIG. 3 comprises a projecting portion 40 and ribs 42 corresponding to the portion 26 and ribs 28 on first joint element 12 seen in FIG. 2, and performing substantially the same functions.

As shown in FIG. 1, the annular inner edge 44 of receptor element 36 serves to engage and seat behind the widest portion of shoulder element 18 so as to hold the joint 10 in its assembled condition.

The base members 16 and 34 of the joint elements 12 and 14 are, as seen in FIGS. 2 and 3, generally square in profile and each is formed with a flat abutment surface 46,48 respectively. These surfaces are positioned for face-to-face contact, each with the other, in the assembled condition of the joint as shown in FIG. 1. The abutment surfaces 46 and 48 are substantially planar and face generally lengthwise of the axis 50 of insertion of the shoulder element 18 into the receptor element 36. The arrangement of the abutment surfaces relative to the shoulder element and receptor element is such that upon insertion of the shoulder element into the receptor element and retention of same thereby, the abutment surfaces make face-to-face contact with each other, thereby defining the retained position of the shoulder element relative to the receptor element, as shown in FIG. 1, and preventing pivotal movement of the joint elements 12 and 14 in the retained position, whereby the ball joint provides a joint which is connectable and disconnectable by the application of compression and tension respectively, while providing the joint with structural integrity in the connected condition thereof.

In use, the joint 10 is extremely simple to assemble. It is fitted into the structures to be joined by mere application of compressive force. The structures can then be joined by simple placement of the shoulder element 18 against the receptor element 36 and applying compression to the assembly. The shoulder element and/or the receptor element deforms slightly elastically to permit the shoulder element to pass into its assembled position shown in FIG. 1 where it is retained by engagement of the retainer members on its portion 38.

Disconnection merely requires application of sufficient tension to the joint assembly. Tensile loads below this limit do not disconnect the joint. Moreover, all the time that the joint is in its assembled condition, the two structures 32 and 52 joined thereby have structural integrity and pivotal movement between them is, by virtue of the face-to-face engagement of the flat abutment surfaces 46 and 48, prevented.

Turning now to the embodiments of FIGS. 4, 5 and 6, there is shown in FIG. 4 a module 54 for a stackable table or shelving system. Module 54 comprises a rectangular frame 56 having four projecting legs 58 and a flat load-supporting plate 60 mounted on frame 6, to carry objects on the shelving or table system. Module 4 is a fabrication from mild steel or the like and so far as the frame, legs and plate 60 are concerned, is generally of conventional construction. However, joint means is provided to enable module 54 to be assembled with other similar modules as shown in FIG. 5, to form a stackable table or shelving system, or indeed the stackable table or shelving system shown in FIG. 6. For this purpose, module 54 is provided with four joints 10 for joining to the corresponding joints on adjacent modules. As shown in the figures, each module comprises four joint first elements 12 mounted at the corners of frame 56 and at the lower end of each of the legs 58 there is mounted a second joint element 14 for co-operation with the complementary first joint elements of the adjacent modules. Thus, the joint element at the bottom of each leg has an aperture or receptor unit 36 and the joint element at the top or frame end of each leg has the projecting shoulder element 18.

As seen in FIG. 5, the modules 54 can be readily stacked in a vertical assembly. This can be achieved very quickly. Likewise, the stack can be readily disconnected by simply pulling the modules apart manually. This enables multiple uses of the equipment to be readily accomplished.

FIG. 6 shows an alternative stacked arrangement of the modules. It will be appreciated that many other variations are possible.

In these embodiments, the shoulder elements 18 are exposed on the upper portion of the modules. These shoulder elements are relatively small compared with the size of the modules as a whole. Moreover, the shoulder elements are neat and spherical and do not detract from the overall appearance. Indeed, they can be decorated to some extent if necessary.

Figure 7:
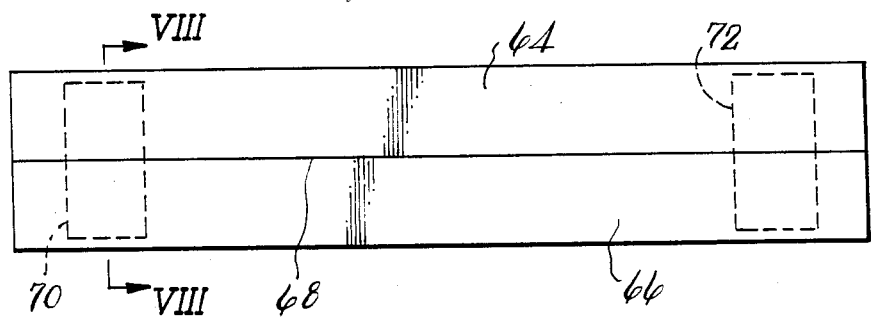
FIG. 7 shows a side elevation view of a beam assembly comprising two channel sections and modified ball and type joints.
Figure 8:
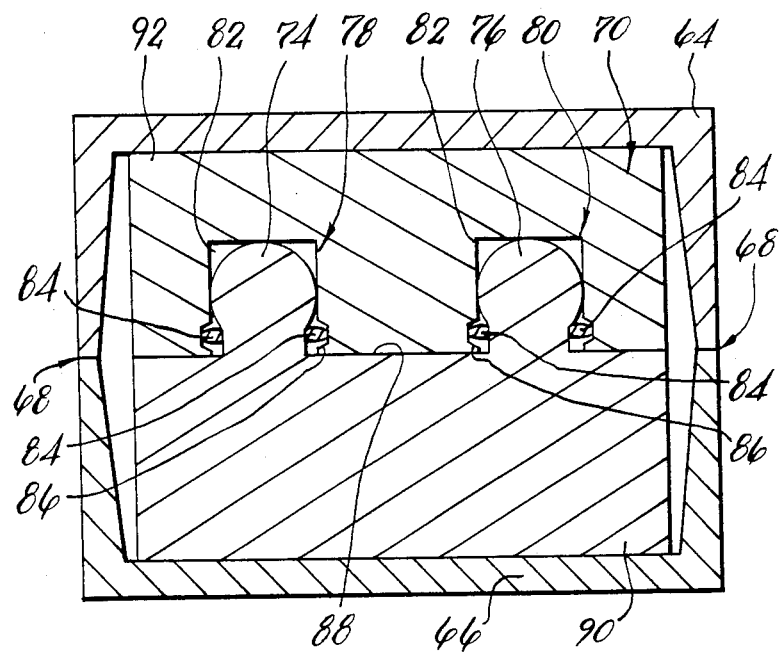
FIG. 8 shows a section through the beam of FIG. 7, the section being taken on the line VIII—VIII.

Turning now to the embodiment of FIGS. 7 and 8, a beam 62 comprises a pair of channel sections 64, 66 mounted in superimposed parallel relationship with their longitudinal edges 68 in abutting relationship so that the beam is effectively closed except at its ends. Within the beam are provided two joint assemblies 70,72 according to the invention. These serve to secure the channel sections in their superimposed relationship. Moreover, the joint assemblies are effectively hidden by the channel sections and are thus invisible.

In this embodiment, the joint assemblies differ somewhat from those described above. As shown in FIG. 8, each joint assembly comprises two generally spherical shoulder elements 74,76 received within receptor elements 78,80 each comprising a recess 82 to receive the shoulder element and a pair of spaced retainer members 84 in the form of springs and located in annular grooves 86 for engagement with the waist portion of the shoulder elements.

Extensive planar abutment surfaces 88 are provided on the base members 90,92 so as to further ensure that no pivotal movement of the joint assembly can occur in the joined condition thereof.

In use, the joint assembly is merely pressed together into its assembled condition when required and later forced apart when necessary for disconnection.

Among the advantages provided by the embodiments described above are the following. Firstly, the ball and socket type joint provides a simple means of positively holding the joint assembly in its joined condition. Furthermore, the joint permits simple disconnection by mere application of tension. At the same time, the positive holding of the joint in its assembled condition enables the various means for preventing pivotal movement, including abutment surfaces, three or more shoulder and receptor elements, and abutment means on the structures being joined, to act to provide structural integrity in the assembled condition of the structural units. Thus, contrary to all the normal expectations of ball and socket type joints, by the techniques of the invention such joints have been caused to provide functions which are normally totally alien to their nature. Consequential advantages arising from these features of the ball and socket type joints include the provision of stackable and unstackable structural units such as tables, shelving, trolleys and the like. The technique is applicable also to scaffolding and other larger scale structures.

The simplicity of the joint units means that their manufacturing cost is relatively low, and this is particularly so since the requirements for close tolerances in production are avoided by means of the techniques described above.

Among modifications which could be made in the above embodiments while remaining within the scope of the invention are the following. Firstly, more than one abutment surface may be provided on each joint element. These surfaces can be at differing angles, each surface being flat or planar. Secondly, the receptor element may be merely a two-sided or three-sided device. For example, a prong-like receptor element might well be suitable for certain applications.

Thirdly, as regards the shoulder elements, it should be noted that these can vary in design considerably so long as they are readily insertable and removable in the manner described above. For this purpose the basic requirement is for a shoulder wider than the waist and tapers leading to the shoulder from both sides.

I claim:

1. A structural module such as a shelf or table unit adapted to be connected to a complementary module in directly superimposed and stacked relationship to form a structually integral assembled structure, said module comprising a frame having at least three projecting legs, each of which legs has two opposite ends, each of said legs further having a ball joint means on one of its ends and a socket joint means on the other of its ends, said ball joint means including a first base member and a ball element carried on said first base member, and said socket joint means comprising a second base member having a recess defining a socket element adapted to receive and hold a ball element such as that of said ball joint means, said socket element being sized and shaped to receive a ball element such as that of said ball joint means and to permit such ball element to be inserted in said socket element by applying compression between such joint elements so as to cause resilient deformation of at least one of said joint elements during said insertion followed by retention of such ball element, and said socket element also permitting subsequent withdrawal of such ball element by applying tension between the joint elements, said first and second base members each being formed with a shoulder having an abutment surface, said shoulders engaging the terminal ends of said legs and each of said abutment surfaces being positioned for face-to-face contact with the abutment surface of a complementary joint means on a complementary module when it is part of an assembled joint, said abutment surfaces each being substantially planar and facing generally lengthwise of the axis of insertion of a ball element into a socket element, each of said ball elements projecting outwardly from its associated abutment surface and each of said socket elements being located closely adjacent to its associated abutment surface, the arrangement of said abutment surfaces being such that upon insertion of a ball element into a socket element and retention of the ball element thereby the associated abutment surfaces make face-to-face contact with one another thereby defining the retained position of the ball element relative to the socket element and inhibiting pivotal movement of the involved elements in said retained position, said ball elements on said legs being exposed to view for engagement and connection to complementary socket elements on the opposite ends of the legs of another complementary module, whereby said module can be used individually or assembled with one or more complementary modules to form a structurally integral assembled structure without any modification of its structure.

2. The structural module of claim 1 wherein each of said legs of said module comprises a hollow structure and each of said base members is constructed to be a friction fit in one end of its respective leg.

3. The structural module of claim 2 wherein said structural module is generally rectangular in plan view, said legs are provided at each corner of said rectangle, and said ball elements are provided at the upper end of each leg at each corner of a generally flat upper surface of said module.

* * * * *